Nov. 15, 1932.　　　　F. C. LAMB　　　　1,887,936
MOTOR VEHICLE BRAKE
Filed April 21, 1930　　　2 Sheets-Sheet 1
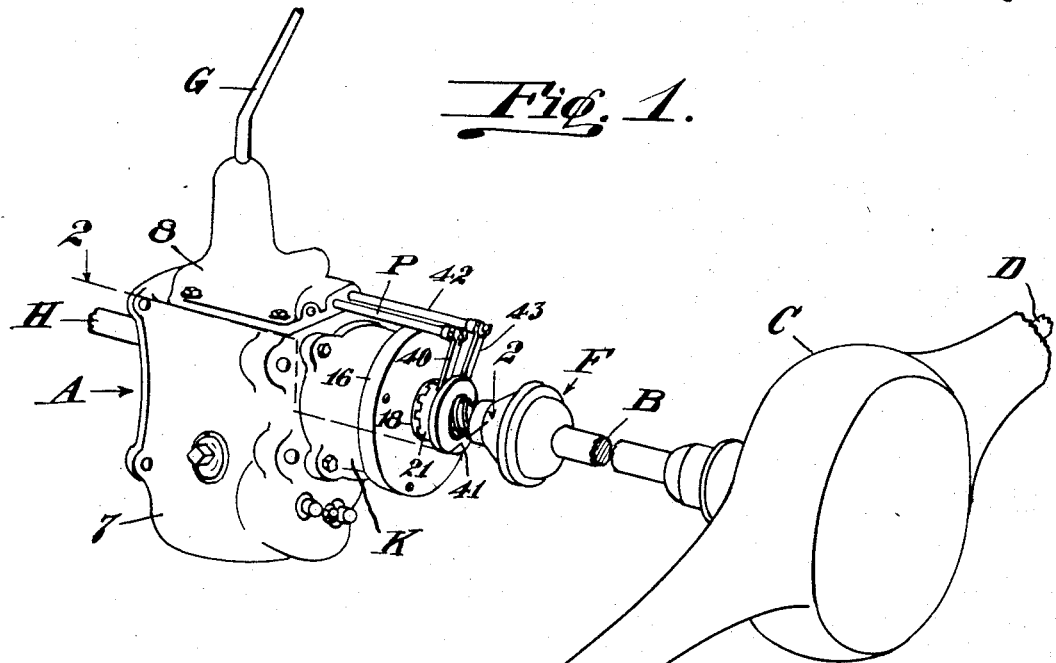
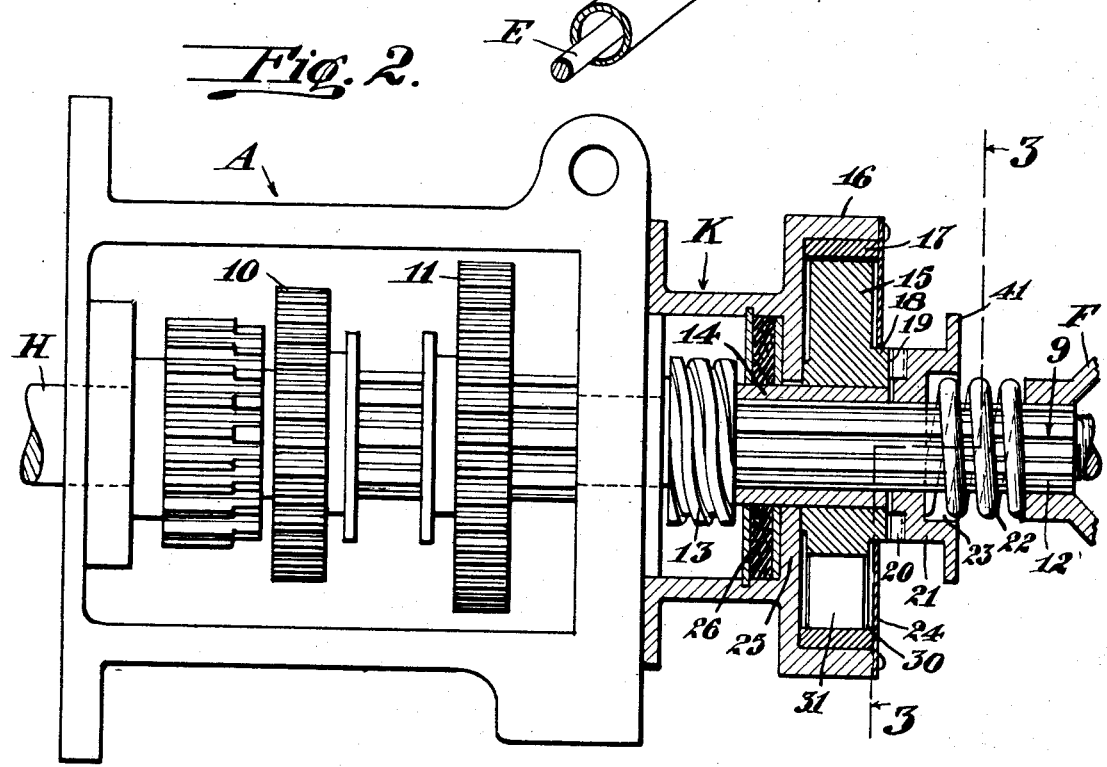
Inventor
Frank C. Lamb
By R. L. Berry
Atty.

Nov. 15, 1932.  F. C. LAMB  1,887,936
MOTOR VEHICLE BRAKE
Filed April 21, 1930  2 Sheets-Sheet 2
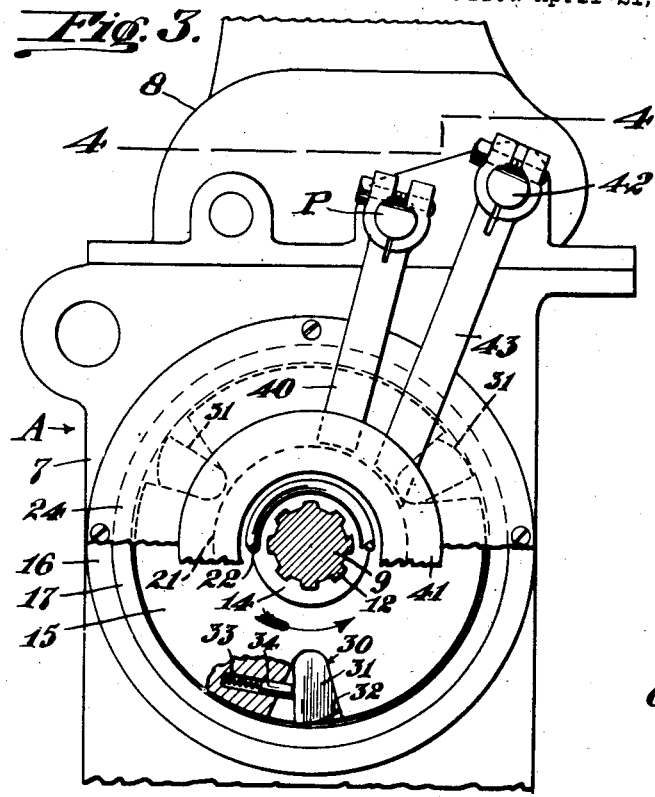
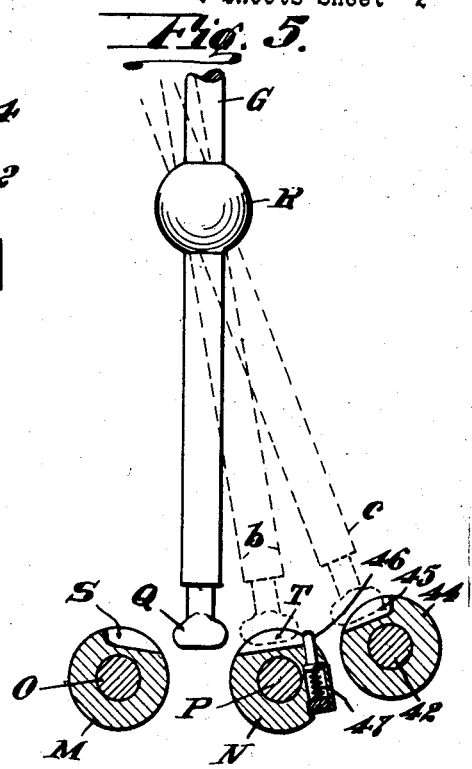
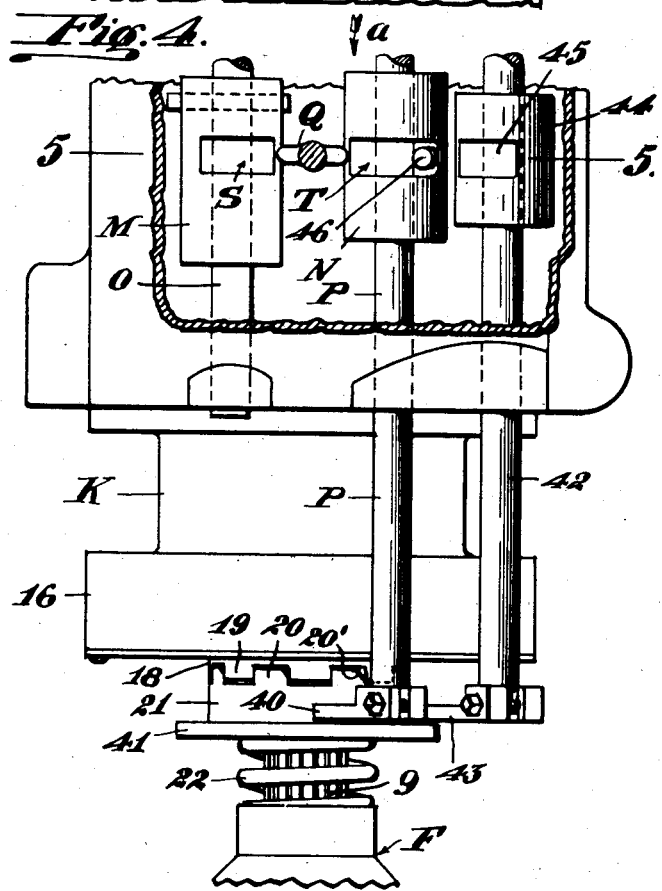
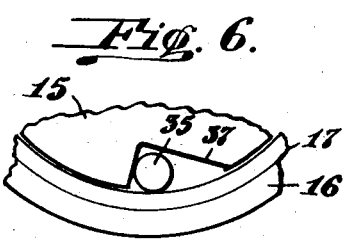
Inventor
Frank C. Lamb
By
R. S. Berry
Atty.

Patented Nov. 15, 1932

1,887,936

UNITED STATES PATENT OFFICE

FRANK C. LAMB, OF LOS ANGELES, CALIFORNIA

MOTOR VEHICLE BRAKE

Application filed April 21, 1930. Serial No. 445,967.

This invention relates to a vehicle brake and more particularly pertains to a mechanism of the character set forth in my copending application for United States Letters Patent filed June 2, 1924, Serial Number 717,276 which has matured into Patent Number 1,827,720 dated Oct. 13, 1931, for automatically inhibiting undesired or accidental reverse movement of a motor vehicle.

An object of the invention is to provide a mechanism which is operable upon the propeller shaft of a power-propelled vehicle to prevent unwanted retrograde movement of the propeller shaft.

Another object is to provide a reverse arresting mechanism for motor vehicles which will not interfere with the propulsion of a vehicle in a forward direction but which will effectively prevent rearward movement thereof at all times except when the reversing mechanism of the vehicle is in operation or when the reverse arresting mechanism is manually placed out of operative condition.

Another object is to provide a reverse arresting mechanism for motor vehicles which is adapted to be automatically operated to permit reverse movement of the vehicle when the reversing mechanism of the latter is placed in operation and also be manually actuated to a neutral position to permit reverse movement of the vehicle other than through its propelling mechanism.

Another object is to provide a brake for preventing rearward movement of a motor driven vehicle which is adapted to be associated with the transmission machanism of the vehicle in such manner as to normally prevent retrograde rotation of the vehicle drive shaft under the urge of reverse rotative efforts applied thereto through the vehicle wheels when the vehicle transmission mechanism is normally in neutral, but which is operable by manipulation of the transmission control lever on positioning the latter to dispose the transmission mechanism in reverse to permit retrograde rotation of the drive shaft and which may also be rendered neutral by manipulation of the transmission control lever and so remain while the transmission mechanism is in neutral to permit reverse rotation of the drive shaft through the vehicle wheels, and whereby the brake mechanism will be restored into operative relation with the vehicle drive shaft on moving the transmission control lever to its neutral position.

Another object is to provide a reverse arresting brake for motor vehicles which on being applied to inhibit reverse movement of the vehicle, will permit immediate advance movement of the vehicle and without necessitating or permitting any reverse movement of the vehicle before effecting advance thereof.

A further object is to provide a reverse arresting brake of the above character which may be readily associated with the ordinary transmission mechanism of motor vehicles now generally in use and applied to the transmission gear case for coaction with the portion of the vehicle drive shaft projecting from the gear case.

With the foregoing objects in view, together with such other objects and advantages as may subsequently appear, the invention resides in the parts and in the combination, construction and arrangement of parts, or their equivalent, described in the following specification, set forth in the appended claims and illustrated by way of example in the accompanying drawings, in which:

Fig. 1 is a perspective view illustrating the transmission gear case of a motor vehicle depicting the invention as applied and showing its relation to the drive shaft and rear axle of a motor driven vehicle;

Fig. 2 is a plan view and horizontal section as viewed on the line 2—2 of Fig. 2 showing the gear case with its cover removed and illustrating the reverse arresting brake in horizontal section;

Fig. 3 is a view in elevation and vertical section taken on the line 3—3 of Fig. 2;

Fig. 4 is a view in horizontal section and plan as seen on the line 4—4 of Fig. 3;

Fig. 5 is a detail in section as seen on the line 5—5 of Fig. 4;

Fig. 6 is a detail illustrating a modified form of the brake engaging element.

Referring to the drawings more specifically, A indicates generally the transmission gear case of a motor vehicle which embodies a body portion 7 and a cover portion 8, and B designates a propeller shaft through which motion is transmitted through the usual gearing arranged in the gear case A from a source of power on the vehicle to the driving or traction wheels of the latter as is common in motor vehicle construction; the propeller shaft B being here shown as leading into a differential gear case C where it is geared in the usual manner to the vehicle rear axles D and E affixed to the vehicle wheels in the well-known manner. The propeller shaft B is connected through the usual universal joint in a housing F with a short shaft 9 projecting into the gear case A and forming part of the propeller shaft B, which shaft 9 has the usual transmission gear wheels 10 and 11 splined thereon interiorly of the gear case; the gear wheels 10 and 11 being adapted to be shifted through the medium of a manually operable gear shift lever G to effect change speed and reverse rotation of the shaft 9 and propeller shaft B from a power-propelled shaft H in the well-known manner. The outer portion of the shaft 9 is formed with the usual longitudinally extending ribs 12, and carries a speedometer operating worm wheel 13 enclosed in a housing K carried on the gear case A.

In carrying out the present invention, a sleeve 14 is mounted on the shaft 9, adjacent the worm wheel 13, and is affixed to the shaft through the medium of the ribs 12, and loosely mounted on the sleeve is a disc 15 constituting a movable brake member and being part of the reverse arresting brake. The disc 15 is encased within the outer portion of the housing K; the latter being formed with an end flange 16 fitted with an annular liner 17 fixed thereon which encircles the periphery of the disc 15 in slightly spaced relation thereto or in sliding contact therewith; the liner 17 and flange 16 constituting a fixed brake member.

The outer face of the disc 15 is formed with a hub 18 from which projects a series of end teeth 19 preferably formed with parallel contiguous faces and which teeth are normally engaged by companion teeth 20 formed on a sleeve 21 splined on the shaft 9 to rotate therewith and for movement longitudinally thereof in and out of engagement with the disc 15. The teeth 20 are preferably formed with bevels 20' to facilitate their moving in and out of engagement with the teeth 19. A spring 22, wound around the shaft 9, bears between the inner end of the universal joint housing F and the sleeve 21 to normally maintain the teeth 20 in interengagement with the teeth 19. The sleeve 21 constitutes a positive clutch which normally maintains the brake disc 15 in operative relation to the propeller shaft. The end of the spring 22 presented towards the sleeve 21 extends into an end recess 23 in the latter to economize space. The sleeves 14 and 21 being keyed on the shaft 19 rotate therewith and when the teeth 19 and 20 are interengaged the disc 15 will likewise revolve with the shaft 9.

A demountable face plate 24 carried on the flange 16 of the housing K extends over the outer face of the disc 15 from the hub 18.

The housing K is formed with an inwardly projecting wall 25 extending into close proximity with the outer periphery of the sleeve 14 and interposed between the inner face of this wall and the worm wheel 13 is a packing gland 26 which serves to prevent the passage of grease or lubricant in the chamber enclosing the worm wheel from passing into the space in the housing K enclosing the disc 15 so as to prevent lubrication of the liner 17.

The outer periphery of the brake disc 15 is formed with a plurality of substantially V-shaped recesses 30 in each of which is mounted a dog 31 constituting a brake-engaging element, adapted on rotation of the disc 15 in one direction to ride freely over the inner periphery of the annular liner 17 of the fixed brake member but on slight turning of the disc 15 in a reverse direction will act to effect a wedge engagement with the liner 17 and thereby inhibit reverse rotation of the disc. The disc 15 is thus free to rotate in only one direction and is adapted to be automatically locked against rotation in the other direction. The dog 31 may comprise an oscillatory block as shown in Fig. 3 formed with an inclined end face 32 for effecting engagement with the liner 17, in which event the block is normally positioned out of operative engagement with the liner by means of a spring 33 bearing against a plunger 34 which, in turn, bears against the rear face of the block 31; but in some instances the dog may comprise a roller 35 as shown in Fig. 6 which is adapted to roll freely in its recess on forward movement of the disc and to ride into engagement with an inclined wall 37 of the recess into a wedged position between said wall and the liner 17 on slight reverse rotation of the disc 15 and thereby effect wedge engagement between the disc and the liner 17, so as to prevent continued reverse rotation of the disc.

Means are provided for shifting the splined clutch sleeve 21 out of connection with the brake disc 15 by operation of the hand lever G on moving the latter to dispose the transmission gear mechanism in reverse, and means are also provided whereby the hand lever G may be employed to shift the clutch sleeve 21 out of engagement with the brake disc 15 to place the reverse arresting brake in neutral by placing the brake disc 15 out of operative relation with the shaft 9.

This means is particularly shown in Figs.

4 and 5 wherein the usual gear-shifting elements controlled by the hand lever G are shown as modified and adapted to accomplish the purpose just described. In these views M and N indicate the usual collars affixed to slide rods O and P and which collars are adapted to be selectively engaged by the lower end Q of the hand lever G, which latter carries the usual ball R mounted in a socket formed in the transmission case cover to provide a universal joint whereby the lever G may be rocked laterally and forward and back. The lower end of the lever is positioned between the sleeves M and N when in its neutral position and is swung laterally into engagement with transverse grooves S and T in the sleeves when it is desired to shift the latter longitudinally in effecting movement of the gears 10 and 11 longitudinally of the shaft 9. The collar N is connected to the gear 11 in the usual manner so that when shifting the collar N in the direction indicated by the arrow $a$ in Fig. 4 the transmission mechanism will be thrown into reverse.

In carrying out my invention, the slide rod P is extended to project over the housing K and is fitted at its outer end with a finger 40 which projects rearward of an annular flange 41 formed on the sleeve 21 in such manner that when the slide rod P is moved rearwardly under the action of the lever G the finger 40 will move the sleeve 21 in opposition to the spring 22 to dispose the teeth 20 out of engagement with the teeth 19. Also in carrying out the present invention an additional slide rod 42 is mounted in the transmission case cover 8 to extend parallel with the slide rod P and is fitted at its outer end with a finger 43 extending rearward of the flange 41 on the sleeve 21, and mounted on the slide rod 42 is a collar 44 having a channel 45 extending in alignment with the channel T on the collar N and arranged to receive the lower end Q of the lever G when the end Q is swung past the collar N.

As a means for yieldably opposing movement of the end Q of the transmission control lever G past the collar N, the latter is fitted with a retractable plunger 46 which normally projects into the rear end portion of the groove T under the urge of a spring 47; the plunger 46 extending into the path of travel of the lever end Q, so that when the latter is moved against the plunger 46 such resistance will be offered to continued lateral swinging of the lever that the operator can thereby determine when the lever is engaged with the collar N. The plunger 46, however, is adapted to be depressed by the lever end Q to allow said end Q to ride thereover into engagement with the groove 45 on the collar 44.

In the operation of the invention, the clutch sleeve 21 and brake disc 15 are normally interconnected through the medium of the teeth 19 and 20 as shown in Figs. 2 and 4 and the dogs are positioned to freely traverse the fixed brake liner 17. On rotation of the shaft 9 in a forward direction either through the medium of the motive power employed to propel the vehicle or through the rotation of the propeller shaft B from the drive wheels of the vehicle, as in coasting forwardly, the sleeve 21 and disc 15 will be caused to rotate in unison with the disc turning freely within the housing K. In event that reverse rotative effort is imparted to the shaft B, at any time, from the traction wheel axles D and E while the sleeve 21 and disc 15 are connected together, reverse rotation of the propeller shaft B and of its associated shaft 9 and the traction wheel axles will be immediately prevented by reason of the dogs then moving into locking engagement with the fixed liner 17 on slight retrograde movement of the disc 15.

The dogs thus act to hold the disc 15, sleeve 21 and shaft 9 with its connected parts against turning backward and thereby inhibiting reverse movement of the vehicle on its running gear. This action will occur whether the transmission gear mechanism is in neutral or is in forward gear thus serving to inhibit retrograde movement of the vehicle at all times except when the brake disc 15 and the clutch sleeve 21 are placed out of interconnection.

When it is desired to reverse the vehicle under its own power the operating lever G is moved to place the transmission gear in reverse which is effected by moving operating lever G laterally to effect engagement of its lower end Q with the groove T in the collar N as indicated at $b$ in dotted lines in Fig. 5 and then swinging the lever G forwardly to shift the collar N rearwardly and thereby shift the transmission gear into reverse as is common in transmission gear-shift operation. Rearward movement of the collar N effects rearward longitudinal movement of the rod P and thereby causes the finger 40 to engage the flange 41 on the clutch sleeve 21 and to effect shifting of the sleeve 21 longitudinally of the shaft 9 thereby disengaging the teeth 20 from the teeth 19 and freeing the brake disc 15. The propeller shaft may then be driven in a reverse direction to effect reverse movement of the vehicle.

When it is desired to move the vehicle rearward on its wheels other than under its own power, as may become necessary when the vehicle is parked, the transmission control lever G is rocked laterally so that the lower end thereof will be moved out of engagement with the collar N and into engagement with the groove 45 on the collar 44 as indicated in dotted lines $c$ in Fig. 5, the operating lever being thus swung past the collar N when the latter is in its neutral position whereupon the control lever is swung forwardly so as to effect rearward movement of the collar 44 and the slide rod 42. Rearward movement of the rod 42 causes the finger 43 thereon to engage the flange 41 on the clutch sleeve 21 and effects shifting of the latter out of engagement with the disc 15 as before described. While the parts are thus positioned the vehicle may be freely moved forward or backward as the transmission mechanism is then in neutral.

On restoring the control lever G to its normal position from either its engagement with the collar N or collar 44 the slide rods P or 42, as the case may be, will be restored to normal whereupon the spring 22 will act on the sleeve 21 to effect reengagement of the sleeve and the brake disc. It will now be seen that the anti-reverse brake mechanism will be restored to its operative relation with the propeller shaft whenever the transmission control lever is swung from its reversing position to its neutral position.

By the provision of the two slide rods for actuating the clutch sleeve, and providing the arrangement whereby the control lever G may be utilized to throw out the clutch sleeve through the slide rods, a selective means is provided for placing the anti-reverse brake out of operation under either of two conditions.

While I have herein illustrated and described my invention, specifically in one embodiment thereof, it is obvious that the construction disclosed is subject to being modified to meet varying conditions without department from the spirit of the invention and accordingly the invention comprehends such structure, parts, arrangements, features and constructions as come within the meaning of the terms and within the scope of the appended claims. For example, the invention while here shown as applied to a three speed transmission, it may obviously be employed with a transmission of greater or lesser number of speeds, and while the propeller shaft is shown as employed in driving the rear axles of the vehicle, it may be employed in front wheel drives.

I claim:

1. The combination with the transmission mechanism, the transmission control lever and the propeller shaft of a motor vehicle; of brake means for normally inhibiting reverse rotation of said propeller shaft, means controlled by the transmission control lever for placing said brake means out of operative relation with said propeller shaft when said control lever is actuated to place said transmission mechanism in reverse, and separate means independent of said transmission operable by said transmission control lever for placing said brake means out of operative relation with said propeller shaft.

2. The combination of a propeller shaft, a brake normally inhibiting reverse rotation of said propeller shaft including a sleeve slidable on said shaft, and a brake engaged by said sleeve, a pair of independently movable bars, means on each of said bars for effecting connection with said sleeve, and manually operable means for effecting movement of either of said bars to move said sleeve out of engagement with said brake.

3. The combination with a motor vehicle propeller shaft, of a sleeve splined on said shaft, a brake disc normally engaged by said sleeve, means cooperating with said brake disc for inhibiting reverse rotation thereof on a reverse impulse being imparted thereto through said sleeve from said propeller shaft, and a pair of independent means for positioning said sleeve out of engagement with said disc to permit reverse rotation of said propeller shaft.

4. In a motor vehicle, a propeller shaft, a transmission mechanism through which said propeller shaft may be driven in either direction, a brake normally inhibiting reverse rotation of said shaft, a lever for controlling said transmission mechanism, a clutch normally maintaining said brake in operative relation to said propeller shaft, a pair of independent clutch disengaging elements, and means whereby said elements may be selectively operated by said lever to effect disengagement of said clutch; one of said clutch engaging elements being operable by said lever only when said transmission is in neutral.

5. The combination with the propeller shaft of a motor vehicle, of a brake disc encircling the shaft, a clutch normally effecting connection between said shaft and brake disc, a fixed brake member encircling said disc, means interposed between said disc and fixed brake member for limiting rotation of said disc to one direction, means controlling the rotation of said shaft in a forward and a reverse direction including means for placing said clutch out of engagement with said brake disc when effecting reverse rotation of said shaft through said means, and supplemental means for releasing said clutch from said disc.

6. In a motor vehicle having a transmission mechanism, an axle, and a shaft driven directly by said transmission mechanism and rotatable by power applied through said axle; a brake member carried by said shaft and turnable freely therewith in one direction, a fixed brake member, means whereby said brake members will cooperate to inhibit reverse rotation of said shaft on reverse rotative effort being applied thereto through said axle, means operated on disposing said transmission mechanism in reverse for placing said movable brake member out of cooperative relation with said shaft to permit reverse rotation thereof, means for disposing said transmission mechanism in reverse and a second means operable by said last named means independent of said transmission mechanism for placing said movable brake member out of operative relation to said shaft.

7. In a motor vehicle, a propeller shaft, means for normally inhibiting reverse rotation of said shaft, a pair of slide rods, means controlled by each of said rods for placing said reverse inhibiting means out of operation, a transmission mechanism including means for driving said propeller shaft in a reverse direction controlled by one of said slide rods, a lever, means on each of said slide rods arranged to be successively engaged by said lever, and means for yieldably resisting movement of said lever from the lever engaging means on one of said slide rods to the lever-engaging means on the other of said slide rods.

8. In a motor vehicle transmission, a pair of slide rods one of which controls reverse movement of the transmission and the other of which is independent of the transmission, a collar on each of said slide rods formed with a transverse groove, said grooves being disposed in alignment, a control lever having its lower end arranged to be swung into engagement with either of said grooves, said lever being mounted for movement in the direction of the length of said rods, a propeller shaft associated with said transmission, means for inhibiting reverse rotation of said propeller shaft, and means controlled by each of said rods for placing said reverse inhibiting means out of operation.

9. The structure called for in claim 8 including means for yieldably resisting movement of the lever from engagement with one of the grooves into engagement with the other of the grooves.

FRANK C. LAMB.